(12) United States Patent
Lin (10) Patent No.: US 6,385,366 B1
(45) Date of Patent: May 7, 2002

(54) FIBER TO THE HOME OFFICE (FTTHO) ARCHITECTURE EMPLOYING MULTIPLE WAVELENGTH BANDS AS AN OVERLAY IN AN EXISTING HYBRID FIBER COAX (HFC) TRANSMISSION SYSTEM

(75) Inventor: Chinlon Lin, Holmdel, NJ (US)

(73) Assignee: Jedai Broadband Networks Inc., Red Bank, NJ (US)

( * ) Notice: Subject to any disclaimer, the term of this patent is extended or adjusted under 35 U.S.C. 154(b) by 0 days.

(21) Appl. No.: 09/651,834

(22) Filed: Aug. 31, 2000

(51) Int. Cl.[7] ................................................. G02B 6/28
(52) U.S. Cl. ........................ 385/24; 385/46; 385/147; 359/125; 359/127
(58) Field of Search ............................. 385/24, 88, 89, 385/45, 46, 147; 359/125, 127, 124, 118, 167, 137

(56) References Cited

U.S. PATENT DOCUMENTS 5,911,019 A * 6/1999 Cohen ........................... 385/24
6,295,148 B1 * 9/2001 Atlas ........................... 359/125

* cited by examiner

Primary Examiner—Phan T. H. Palmer
(74) Attorney, Agent, or Firm—Brian K. Dinicola (57) ABSTRACT

A method of operating a hybrid fiber coax transmission system to provide Fiber to the Home Office (FTTHO) functionality comprises directing, via a fiber portion of the transmission system, first wavelength division multiplexed (WDM) optical signals corresponding to a first category of subscriber service. The first wavelength division multiplexed WDM optical signals, which are within a first wavelength band, originate at a primary hub or headend and are sent to a plurality of fiber nodes where they are converted to respective electrical signals. The converted electrical signals are transmitted, via a coaxial cable portion of the transmission system, to the homes of individual subscribers. The method further comprises a step of exchanging, via a fiber portion of the transmission system, demultiplexed second WDM optical signals corresponding to fiber-to-the-home office (FTTHO) service between a headend and the home of at least one of the individual subscribers.

20 Claims, 6 Drawing Sheets

FIBER TO THE HOME OFFICE (FTTHO) ARCHITECTURE EMPLOYING MULTIPLE WAVELENGTH BANDS AS AN OVERLAY IN AN EXISTING HYBRID FIBER COAX (HFC) TRANSMISSION SYSTEM

REFERENCE TO RELATED APPLICATIONS

This invention is related to U.S. patent application Ser. No. 09/612,356 filed Jul. 7, 2000 by Chinlon Lin and entitled METHOD OF OPERATING A HYBRID FIBER COAX TRANSMISSION SYSTEM TO DELIVER DIVERSE RESIDENTIAL AND BUSINESS COMMUNICATION SERVICES, and to U.S. patent application Ser. No. 09/640, 311 filed Aug. 16, 2000 by Chinlon Lin and entitled HYBRID FIBER COAXIAL CABLE TRANSMISSION SYSTEM INCORPORATING DUAL BAND MULTIPLE WAVELENGTH OPTICAL NODES, both of which being assigned to the assignee herein, Jedai Broadband Systems, Inc.

BACKGROUND OF THE INVENTION

1. Field of the Invention

The present invention relates generally to the delivery of communication services to subscribers via a communication network and, more particularly, to the transmission of signals within a hybrid fiber coax transmission system.

2. Discussion of the Background Art

Conventional cable television (CATV) systems utilizing a hybrid fiber coaxial (HFC) architecture typically provide downstream broadcast information from a headend or primary hub to optical access nodes for multiple CATV channels using analog (AM-VSB) broadcast signals from about 50 MHz to 350 MHz, 550 MHz, or even 750 MHz. While upgrading from 550 or 750 MHz has allowed system owners to increase revenue by boosting the channel capacity of the coaxial cable portion of their systems and to thereby provide additional services such as premium and pay-per-view channels, each such upgrade requires re-engineering the entire cable plant including at least amplifier replacement and associated amplifier spacing. Further, many conventional system operators also want to provide broadcast digital signals, as well as broadcast analog signals over a single transmission line. However, this is difficult, as impulse noise caused by the analog signals can cause errors in the digital signals. See for example, S. Ovadia and Chinlon Lin (invited paper), *"Performed Characteristics and Applications of Hybrid Multichannel AM-VSB/M-QAM Video Lightwave Transmission Systems"*, IEEE J. Lightwave Tech., 16, 1171 (July, 1998).

As a further means of increasing revenue, and as part of an overall strategy of competing in a field where an operator's continued viability may well depend on an ability to deliver a wide range of services to as many market segments as possible, a few CATV systems owners have sought to expand their subscriber base beyond the traditional residential consumer of broadcast video services. As part of this strategy, CATV system owners have sought to attract and retain small-, medium-, and even large-sized business customers. Such expansion depends, in large part, on an ability to deliver reliable, bi-directional transport of digital signals—at substantially higher data rates than are presently offered to or demanded by typical residential subscribers. Heretofore, such system owners have sought to address this market segment by creating separate operating subsidiaries and deploying new infrastructure similar to those used by traditional local exchange carriers. It should be readily apparent that such a strategy, in which the cable company invests the same resources as any other market entrant (i.e., an independent local exchange carrier), yields no intrinsic competitive advantage to the HFC network owner/operator.

A trend which presents a significant opportunity to the hybrid fiber coax system operator is the proliferation of home based businesses and telecommuters with an increasing appetite for high capacity, bidirectional bandwidth. Unfortunately such needs are not adequately addressed by the so-called cable modem subscription service presently offered, due to its limited bandwidth—which actually decreases as new subscribers are added—and it is expected that the growth in demand for capacity by such "home office" users will only accelerate over time.

There do now exist HFC systems that provide two-way transmission of information, e.g., video, audio, multimedia, and/or data, between a headend and a plurality of subscribers. Typically, the headend transmits the information destined for individual subscribers ("downstream information") in a wavelength division multiplexed optical format, via one or more optical links, to one or more optical access nodes. Each fiber node converts the optically formatted downstream information into electrical signals for distribution, via a coaxial cable plant having a tree and branch architecture to individual subscribers. In addition to receiving the downstream information, each individual subscriber may generate information, in the form of voice, video, data, or any combination thereof, destined for the headend. The subscriber generated information ("upstream information") is aggregated by the coaxial cable plant and passes to the optical access node for conversion into an optical format for transmission to the headend. The bandwidth (e.g., 5–40 MHz) associated with the upstream information is shared by all subscribers served by the same optical access node. As such, while this arrangement may be well suited to the delivery of bidirectional communication services to residential subscribers, it does not address the high bandwidth needs of the typical home-business customer.

More advanced systems being deployed or contemplated by traditional telephone carriers include the so-called Fiber-To-The-Home (FTTH) architecture, in which optical signals are exchanged between a central office and the homes of residential telephone service subscribers via a network of optical fiber links. Although such systems are quite attractive in terms of their ability to deliver a wide array of individually customized telecommunications services, the associated capital cost remains the most significant disincentive for their widespread deployment by local cable providers. While some subscribers would undoubtedly be willing to pay a higher price for access to a more sophisticated telecommunications network, at present such interest has not been deemed sufficiently high by cable system operators to warrant a total replacement of their existing infrastructure.

Accordingly, there exists a need for a hybrid fiber coax (HFC) network architecture, and method of upgrading and operating the same, which allows the owner or operator of a hybrid fiber coax network to gradually and strategically extend the benefits of a FTTH network as it attracts the subscribers willing to pay for them, while still deriving the maximum benefit of its existing infrastructure. Such an architecture, initially comprising what might be better termed a Fiber To The Home Office (FTTHO) network architecture, would advantageously provide a graceful upgrade path which, ultimately, would culminate in a state-of-the-art FTTH network.

SUMMARY OF THE INVENTION

The aforementioned needs are addressed, and an advance is made in the art, by a hybrid fiber coaxial cable (HFC)

network incorporating a multiple wavelength overlay to deliver Fiber to the Home Office (FTTHO) services alongside traditional residential subscription services over coaxial cable. First wavelength division multiplexed (WDM) optical signals corresponding to a first category of subscriber service are directed, via a fiber portion of the transmission system, from a headend to a plurality of fiber nodes for conversion to respective electrical signals. The converted electrical signals are transmitted via a coaxial cable portion of the transmission system to individual subscribers. Second WDM optical signals corresponding to a second category of subscriber service are exchanged, via a fiber portion of the transmission system, between a headend and at least one of the individual subscribers, by demultiplexing them and transmitting them to such individual subscribers over optical fibers (i.e., without first converting them to electrical signals and without using the existing coaxial cable plant). As more subscribers opt for the enhanced, FTTH service accommodated by the dual attachment of coaxial cable and optical fiber to the nearest network node, a suitable multiplexing technique such, for example as time division multiplexing (TDM), may be employed to allow many homes to be served by each demultiplexed wavelength. For newer construction, the need to further extend the coaxial plant may be obviated, with the new homeowners receiving fiber to the home service when they move in. In this way, the benefits of a FTTH system may be extended in a strategic manner only where it is economically feasible to do so, starting with those residential and/or home-based business subscribers having a present need and/or desire for them.

In accordance with an especially preferred embodiment of the present invention, the first WDM optical signals are within a first wavelength band and the second WDM optical signals are within a second wavelength band different from the first wavelength band. By way of illustrative example, the first wavelength band may be between from about 1530 nm to about 1560 nm, and the second wavelength band may be between from about 1570 nm to about 1610 nm.

Other objects, advantages, and features of the invention will become apparent from the detailed description taken in conjunction with the annexed drawings, which depict illustrative embodiments of the invention.

BRIEF DESCRIPTION OF THE DRAWINGS

The invention will be described with reference to the following drawings in which like reference numerals refer to like elements and wherein.

DETAILED DESCRIPTION OF THE INVENTION

Figure 1:
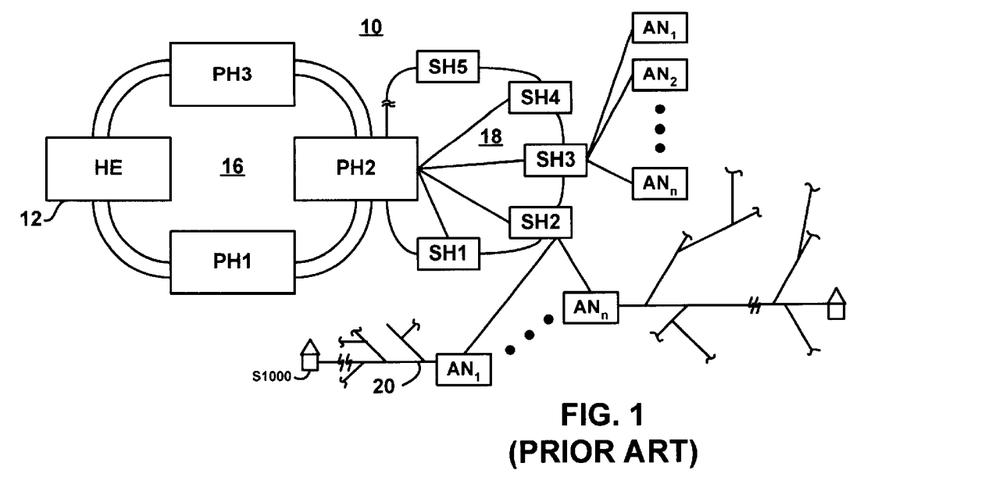
FIG. 1 is a diagram showing a conventional hybrid fiber coaxial cable (HFC) CATV network.

With initial reference to FIG. 1, there is shown a conventional HFC system indicated generally at 10 and including a master headend 12, at which broadcast communication signals such, for example, as 50–550 MHz amplitude modulated video signals 14 are launched into a fiber ring 16. Fiber ring 16 optically couples headend 12 to a plurality of primary hubs—only three of which, indicated generally at PH1, PH2, and PH3, respectively, are shown, to form a primary hub arrangement capable of serving from one hundred thousand to four hundred thousand residential subscribers. As exemplified by PH2, each primary hub in turn distributes the communication signals broadcast by headend 12 to a corresponding secondary hub formed by a plurality of secondary hubs interconnected by a second optical fiber ring 18. For clarity, only five secondary hubs, indicated generally at SH1, SH2, SH3, SH4 and SH5, are shown. Typically, a secondary hub may serve from ten to forty thousand residential subscribers. Each secondary hub, as hubs SH2 and SH3, serves one or more optical access nodes, as access nodes $AN_1$ through $AN_n$ associated with secondary hub SH2 and nodes $AN_1$ through $Ah_m$ associated with secondary hub SH3. At each optical access node, optical signals intended for transmission to individual subscribers, as subscriber $S_{1000}$ served by $AN_1$, are converted into electrical signals and launched into a coaxial fiber trunk as trunk 20 served by optical access node $AN_1$. Through multiple stages of power splitting and periodic amplification (not shown), anywhere from 500 to 1000 subscribers are typically served by a single optical access node.

Figure 2:
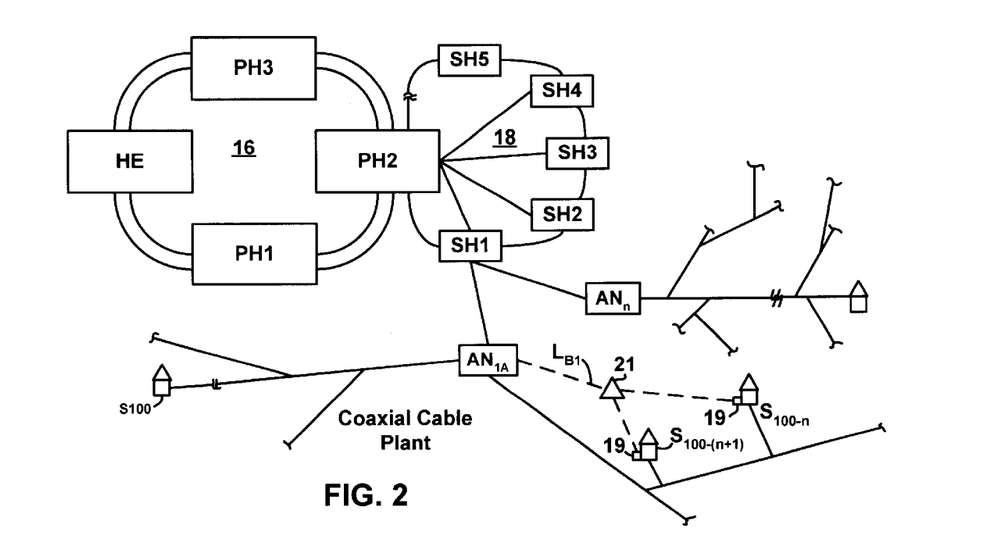
FIG. 2 is a diagram showing an HFC network of the type depicted in FIG. 1, but modified to extend Fiber to The Home Office (FTTHO) functionality to a subset of the subscribers using optical fiber links in accordance with the present invention.

It is an objective of the present invention to allow an owner and/or operator of an HFC system of the type depicted in FIG. 1 to adapt their existing infrastructure in a manner that accommodates an orderly, economical transition to a Fiber-To-The-Home network. More specifically, an HFC system constructed or modified in accordance with the teachings of the present invention is immediately capable of delivering—along side of traditional cable television subscription services to residential subscribers—digital broadband communication services for home based business and telecommuting subscribers without requiring a dedicated fiber link all the way from the headend and without interfering with the delivery of existing services (e.g., broadcast video transmission) not only to other existing subscribers, but also to the same home(s) in which these businesses and telecommuters reside. A modified HFC network architecture incorporating the teachings of the present invention to achieve this objective is shown in FIG. 2.

As used herein, the term "home business subscriber(s)" should be understood to include, but not be limited to, home based businesses, telecommuters, and business subscribers who are presently receiving traditional CATV subscription services via a coaxial cable distribution system portion of the same HFC network. In any event, and as best seen in FIG. 2, a HFC cable network modified in accordance with the present invention differs from the conventional system of FIG. 1 in that at least some of the optical access nodes are configured to serve a smaller number of residential subscribers (e.g., on the order of about fifty to one hundred subscribers), as well as one or more home business subscribers—whose needs for communication services differ substantially from those of the residential subscribers. In accordance with the present invention, this is achieved by replacing at least one optical access node, such as $AN_1$ of FIG. 1, with a plurality of "mini" optical access nodes only one of which, indicated generally at $AN_{1a}$, is shown. Each mini optical access node is configured to serve a portion of the subset of residential subscribers formerly served by optical access node $AN_1$.

While the existing coaxial cable plant may continue to serve the residential subscribers connected to existing, non-replaced optical access nodes as optical access node $AN_2$, as well as the mini-optical access nodes deployed in accordance with the present invention, the bandwidth requirements of a home business subscriber are addressed by the deployment of at least one additional communication path (e.g., fiber link $L_{B1}$) between the nearest optical access node (e.g., optical access node $AN_{1a}$) and that home business subscriber (e.g., subscriber $HB_1$). Preferably, fiber links as link $L_{B1}$ are bidirectional and to this end may actually comprise first and second optical fibers for communication in upstream and downstream directions, respectively. Each fiber link terminates in an optical network unit (ONU) 19 which, in a conventional manner, may be configured to synchronize with a time slot assigned to each home business subscriber so that a plurality of such subscribers may share a single optical wavelength provided by the local optical access node. Appropriately located passive star splitters, as splitter 21 in FIG. 2 are employed to distribute a time division multiplexed optical signal routed via the optical access node to subscribers $S_{100-n}$ and $S_{100-(n+1)}$. Of course, those skilled in the art will also appreciate that means other than a star architecture employing star splitters may be used to distribute optical signals between the optical access node and a plurality of optical network units. Illustratively, an optical bus structure with power splitting taps or couplers might instead be used.

Advantageously, the larger number of deployed mini-optical access nodes are located closer to the respective subsets of subscribers to minimize the length of fiber used to interconnect the respect FTTHO service subscribers (and, hence, the costs associated with the optical fiber plant installation). Moreover, as mentioned earlier, the use of optical splitters or, alternatively, an optical bus arrangement, advantageously allows the available optical bandwidth to be shared by multiple home business subscribers who are in sufficient proximity to one another, further reducing the cost of installation. It is thus possible to implement a graceful transition from a conventional HFC system to a fully functioning FTTH network by introducing optical splitters and optical network units on an incremental, as needed basis to fulfill only the current needs of the subscribers willing to pay for enhanced service, until the remaining infrastructure needed to extend the FTTH architecture to all subscribers is sufficiently small as to be a financially acceptable investment for the network operator to undertake.

In accordance with a further aspect of the invention, at least some of the optical communication signals exchanged between the primary hubs and the secondary hubs are wavelength division multiplexed signals, with optical signals at wavelengths within a first band (e.g., wavelengths $\mu_1-\lambda_n$) being destined for or originating from residential subscribers, as subscriber $S_{100}$ served by optical access node $AN_{1a}$ and optical signals within a second band (e.g., wavelengths $\lambda_{n+1}-\lambda_m$) being destined for or originating from home business subscribers, as subscribers $S_{100-n}$ and $S_{100-(n+1)}$ served by optical access node $AN_{1a}$ (FIG. 2). In accordance with an especially preferred embodiment of the present invention, a wavelength band conventionally known as the "C-band" (typically from about 1530 nm to about 1560 nm) is used to define wavelength channels associated with the residential subscribers and a wavelength band conventionally known as the "L-band" (typically, from about 1570 nm to about 1610 nm) is used to define wavelength channels associated with home business subscribers.

A multiple wavelength band arrangement is preferred because it provides a seamless upgrade path for the owner of an existing network by allowing a graceful transition to a first phase of operation, during which, for example, the wavelength channels of the first band are already allocated to the delivery of existing and planned services to residential subscribers using multiplexers, demultiplexers, filters, and amplifiers specifically designed for operation in that wavelength band, and during which, for example, the wavelength channels of the second band are reserved for the delivery of home business services. In most existing HFC transmission systems of today, it is the C-band which is currently allocated to the provision of residential subscriber services. In a later second phase, as the availability of reasonably priced, reliable, high speed communication services attracts business customers, the existing infrastructure need only be supplemented by adding multiplexers, demultiplexers, filters, and amplifiers specifically designed for operation in the second band (e.g., the L-band).

Figure 3:
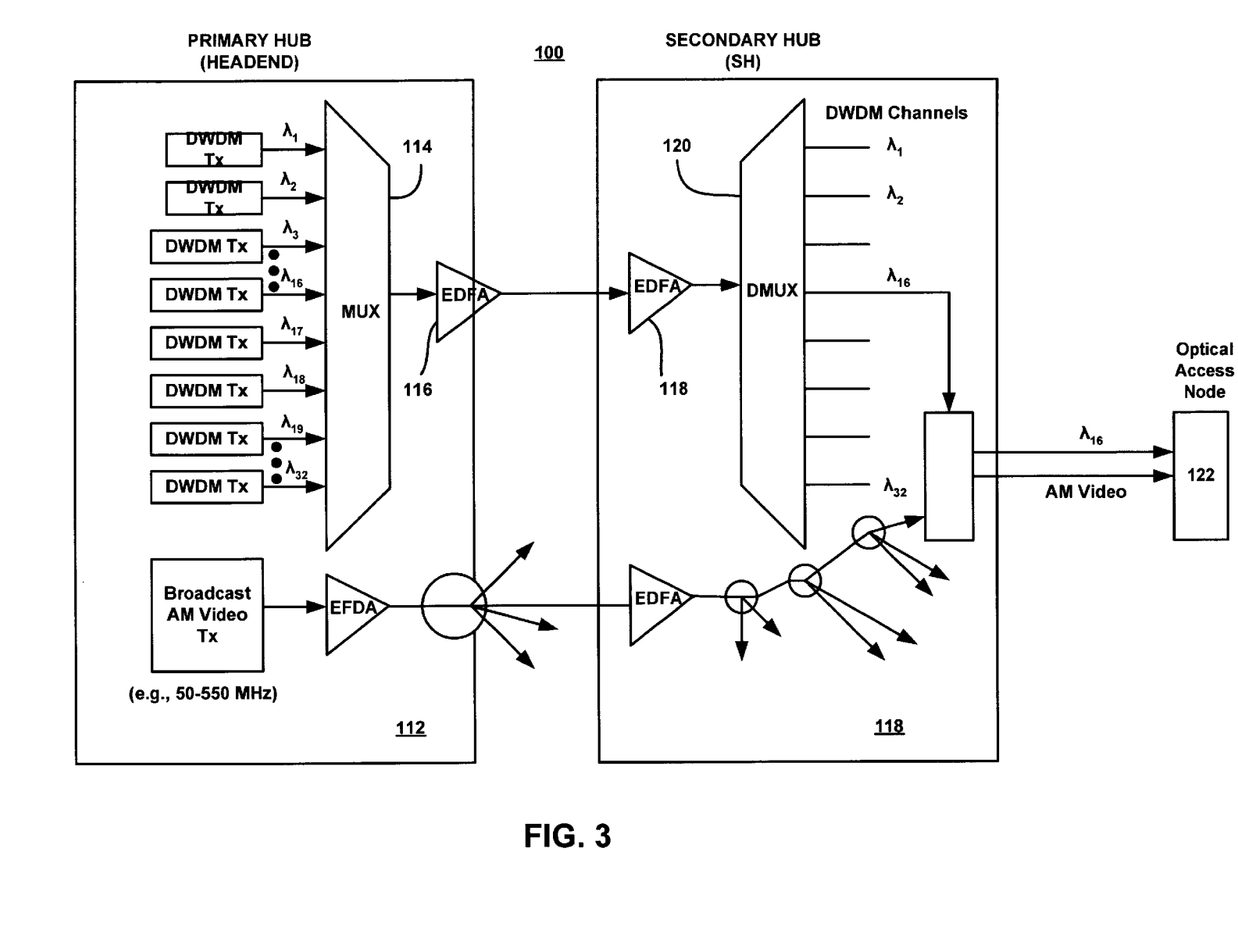
FIG. 3 is a diagram depicting the interaction between primary hub, secondary hub, and optical access node as signals originating at the headend are distributed in the downstream direction towards subscribers.

Turning now to FIG. 3, then, there is shown an exemplary thirty-two wavelength channel HFC network 100 constructed in accordance with a simplified embodiment of the present invention. The depiction of 32 wavelength channels is for purposes of illustration only, and it should be understood that any number of wavelengths (e.g. 8, 16, 32, 40, 64, 128, etc) may be in fact be used. In any event, it will be seen that originating at any node (HE, PH1, PH2, PH3, etc) of primary hub 112, optical wavelengths or channels $\lambda_1$ through $\lambda_{16}$ carry, by way of illustrative example, quadrature amplitude modulated (QAM) compressed digital video (for example, MPEG-2) and data signals intended for transmission over coaxial cable to residential subscribers while optical channels $\lambda_{17}$ through $\lambda_{32}$ transport base-band high speed digital signals intended for business subscribers, including home business subscribers. The latter signals may be modulated, for example, at rates of 2.4 Gb/s and/or 10 Gb/s, and are directed to the home or business by optical fiber links, rather than coaxial cable. In this embodiment the sets of wavelength channels are multiplexed by a single multiplexer 114, in a closely spaced, so-called dense WDM arrangement, such that amplification (if needed) may be performed by a single amplifier as erbium doped fiber amplifier (EDFA) 116.

To emphasize that the present invention need not interfere with the existing delivery of residential services, it will be seen that broadcast AM video signals are carried over a separate optical channel over a separate fiber, totally independent of the thirty two channels $\lambda_1$ through $\lambda_{32}$. As noted earlier, the precise number and allocation of the wavelengths to each band may vary substantially from one installation to the next. Where the teachings of the present invention are being extended to an existing installation, which will typically be the case, there may, for example, be anywhere from 8–64 be assigned to existing residential service applications. As will be explained in more detail later, the present invention has the advantageous feature of providing added capacity right alongside of the existing arrangement. That is, anywhere from say 8 to 64 new additional channels are allocated to the provision of FTTHO services.

In any event, and with continued reference to the illustrative embodiment of FIG. 3, it will be seen that the thirty-two wavelength multiplexed optical channels are delivered from a primary hub as primary hub 112 to a secondary hub as secondary hub 118. Depending on the total loss budget and the distance of transmission, neither, one or both of EDFA 116 and EDFA 118 may be needed. At the secondary hub 118, the thirty-two optical channels are wavelength demultiplexed by demultiplexer 120 for routing to respective optical access nodes as access node 122 which, in turn, are configured to provide access to a subset of the network's subscribers that may include both residential and business subscribers. In the illustrative example of FIG. 3, the wavelength channel $\lambda_{16}$ is supplied as a QAM signal on a first fiber, along with a broadcast analog AM video signal on a second fiber, to optical access node 122 for conversion to electrical signals and transmission over a coaxial cable trunk (not shown) to the subset of residential subscribers.

Figure 4:
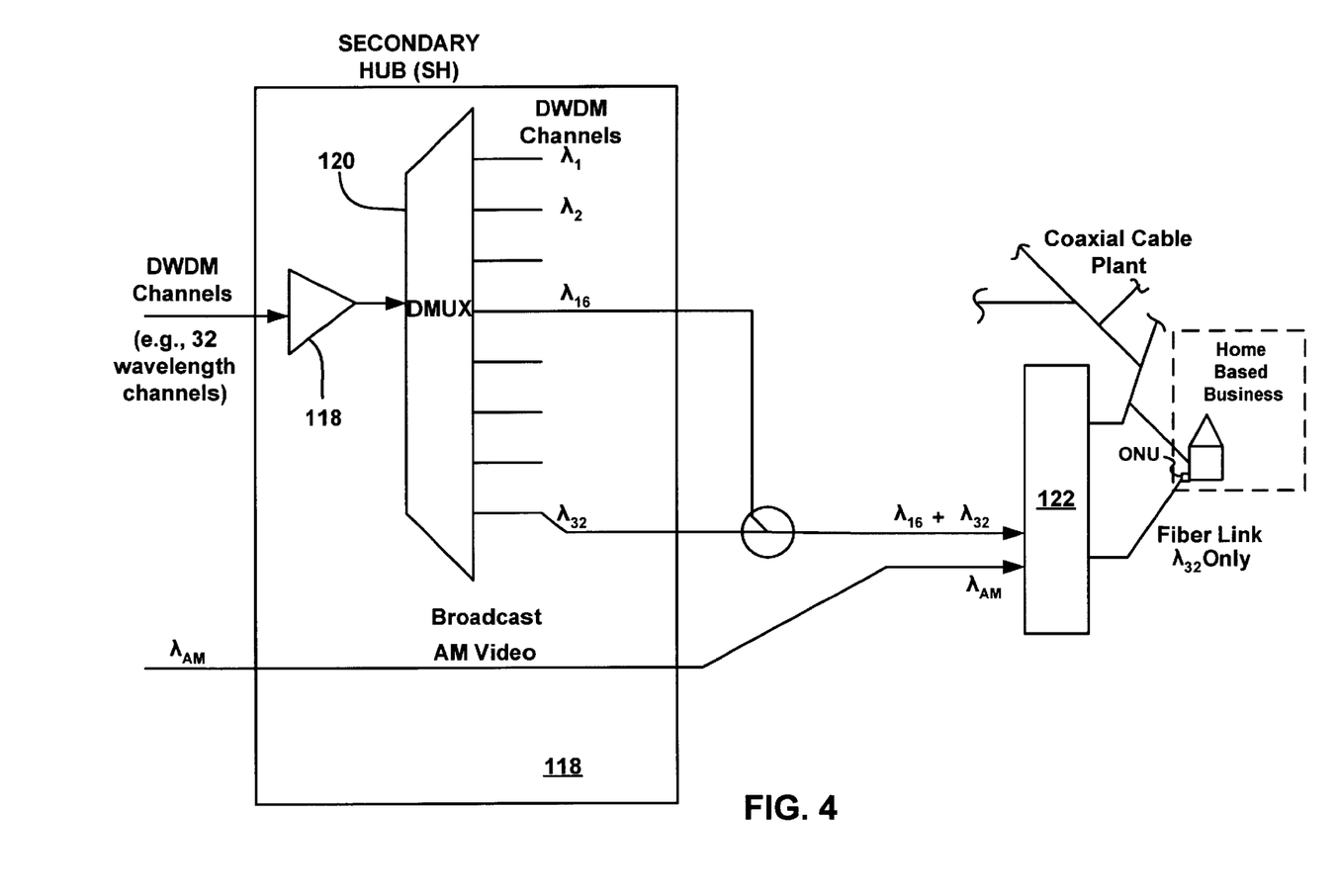
FIG. 4 is a diagram illustrating in greater detail the interaction between a secondary hub and an optical access node to deliver FTTHO functionality to home based business and telecommuter subscribers over specifically assigned wavelength channels in accordance with the present invention.

Turning now to FIG. 4, it will be more clearly seen that optical access node 120 may be further configured to exchange optical signals with one or more of the same residences whose needs for communication services are not met by a coaxial connection alone. To this end, one of the wavelength channels associated with the delivery of digital broadband communication services, e.g., wavelength channel $\lambda_{32}$, is combined with wavelength channel $\lambda_{16}$ for delivery to optical access node 122. By way of illustration, exemplary wavelength channel $\lambda_{32}$ may be modulated to a digital signal format such as SONET OC-48 (2.4 Gb/s), Gigabit Ethernet for data (1.2 or 2.4 Gb/s), OC-192 (10 Gb/s) or 10 Gigabit Ethernet (10 Gb/s). Exemplary wavelength channel $\lambda_{16}$, on the other hand, may be QAM modulated for video on demand services (e.g., 550–750 or 550–870 MHz). Digital signals corresponding to FTTHO service are exchanged between the home business subscriber and opitcal access node via an optical network unit (ONU) 119. A conventional coaxial cable distribution network provides traditional signals, such for example, as amplitude modulated or quadrature amplitude modulated video signals, to the same home.

Figure 5:
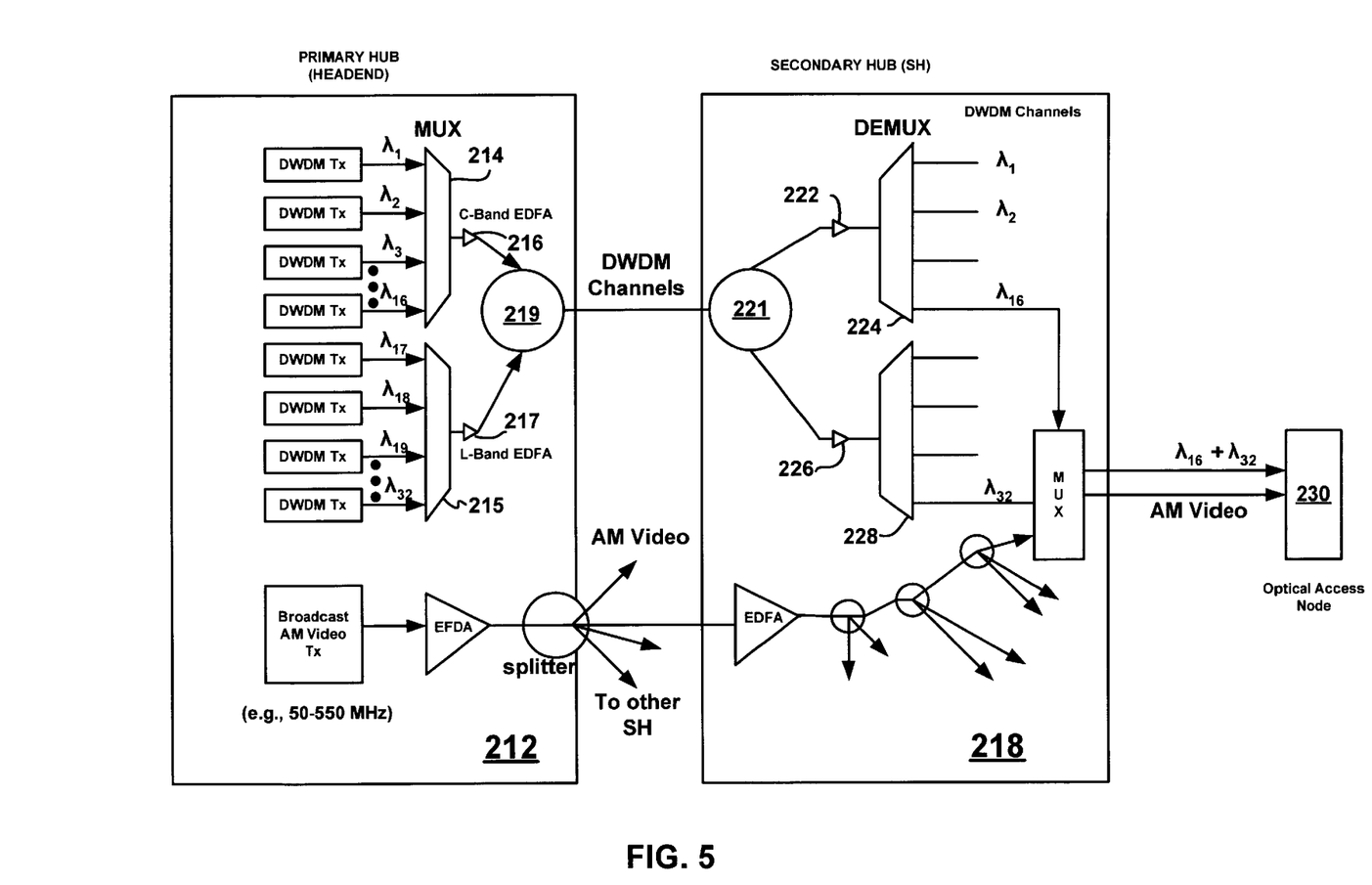
FIG. 5 is a diagram depicting a network of the type generally shown in FIG. 1, but modified to implement a multiple (dual, for example) wavelength band overlay, a first wavelength band continuing to distribute CATV signals via interaction with the existing coaxial cable plant, and a second wavelength band accommodating Fiber To the Home Office (FTTHO) functionality in accordance with the teachings of the present invention.

With reference now to FIG. 5, there is shown a DWDM HFC network 200 constructed in accordance with a further embodiment of the present invention. In the embodiment of FIG. 5, the wavelength channels associated with the delivery of broadcast and communication services to residential subscribers (illustratively wavelength channels $\lambda_1$ through $\lambda_{16}$) fall within the so-called C-band (typically from about 1530 to about 1560 nm) of the optical spectral region while the wavelength channels associated with the delivery of communication services to home based business subscribers (illustratively wavelength channels $\lambda_{17}$ through $\lambda_{32}$) fall within the so-called L-band (typically from about 1570 nm to about 1610 nm) of the optical spectral region. Unlike the arrangement depicted in FIG. 3, in this case separate optical amplifiers, multiplexers, and demultiplexers are needed for each wavelength band. Accordingly, within a primary hub as primary hub 212, wavelength channels $\lambda_1$ through $\lambda_{16}$ are multiplexed by C-band multiplexer 214 and amplified by C-band amplifier 216, while wavelength channels $\lambda_{17}$ through $\lambda_{32}$ are multiplexed by L-band multiplexer 215 and amplified by L-band amplifier 217. The respective amplified WDM signals are combined via optical coupler 219 and thereafter supplied from primary hub 212 to secondary hub 218.

The C/L band WDM signal is received by each secondary hub as hub 218 and, at each secondary hub, is split into first and second signals by power splitter 221. The first signal is routed to C-band amplifier 222 and demultiplexed by C-band demultiplexer 224, while the second signal is routed to L-band amplifier 226 and demultiplexed by L-band demultiplexer 228. In this manner, a dual wavelength band overlay is obtained. It will likewise be appreciated by those skilled in the art that by appropriate selection of components, any number of discrete wavelength bands may be constituted for additional scalability and flexibility.

Figure 6:
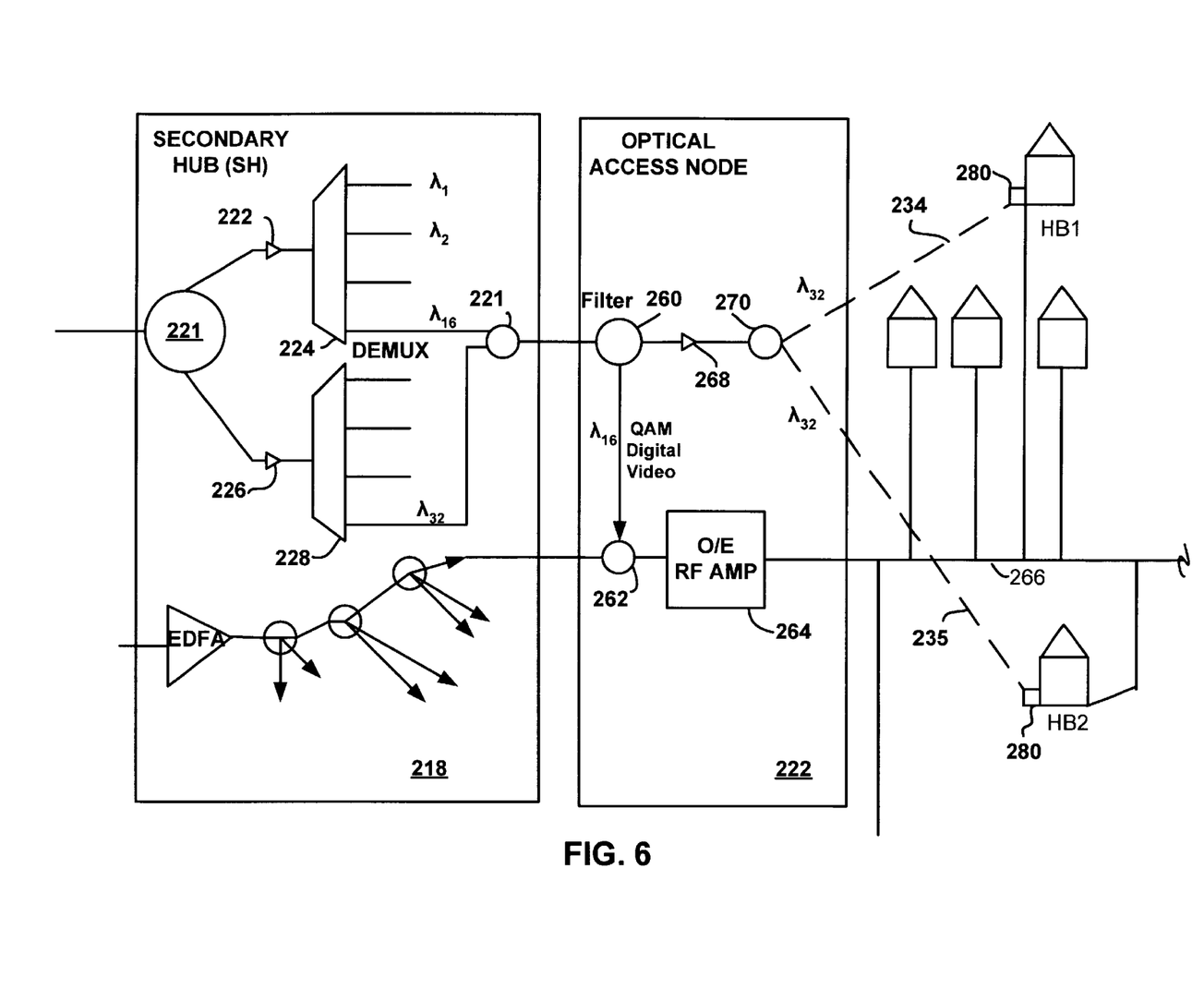
FIG. 6 is a diagram showing in greater detail the interaction between a secondary hub and an optical access node to make use of respective wavelength channels from corresponding wavelength bands to deliver both traditional residential subscription CATV services node and FTTHO service to selected homes.

As in the embodiment shown in FIGS. 3 and 4, it will be seen that broadcast AM video signals are carried over a separate optical channel over a separate fiber, totally independent of the thirty two wavelength channels $\lambda_1$ through $\lambda_{32}$. Likewise, and as best seen in FIG. 6, one of the wavelength channels associated with the delivery of business communication services, e.g., wavelength channel $\lambda_{32}$, may be combined, at a secondary hub, with a wavelength channel associated with the delivery of residential communication services, e.g., wavelength channel $\lambda_{16}$, for delivery to an optical access node—illustratively, optical access node 230. At optical access node 230 (FIG. 7), the C-band wavelength channel and separate broadcast video channel (if present) are converted into electrical signals for transmission over the coaxial cable plant 232 and distribution to a subset of residential subscribers served by optical access node 230. The L-band wavelength channel, on the other hand, is forwarded only to selected subscribers of the subset, those such as home based business subscriber and telecommuting subscribers (e.g., subscribers HB1 and HB2) via a suitable bi-directional path as fiber links 234 and 235 (which may comprise one or more optical fibers).

Figure 7:
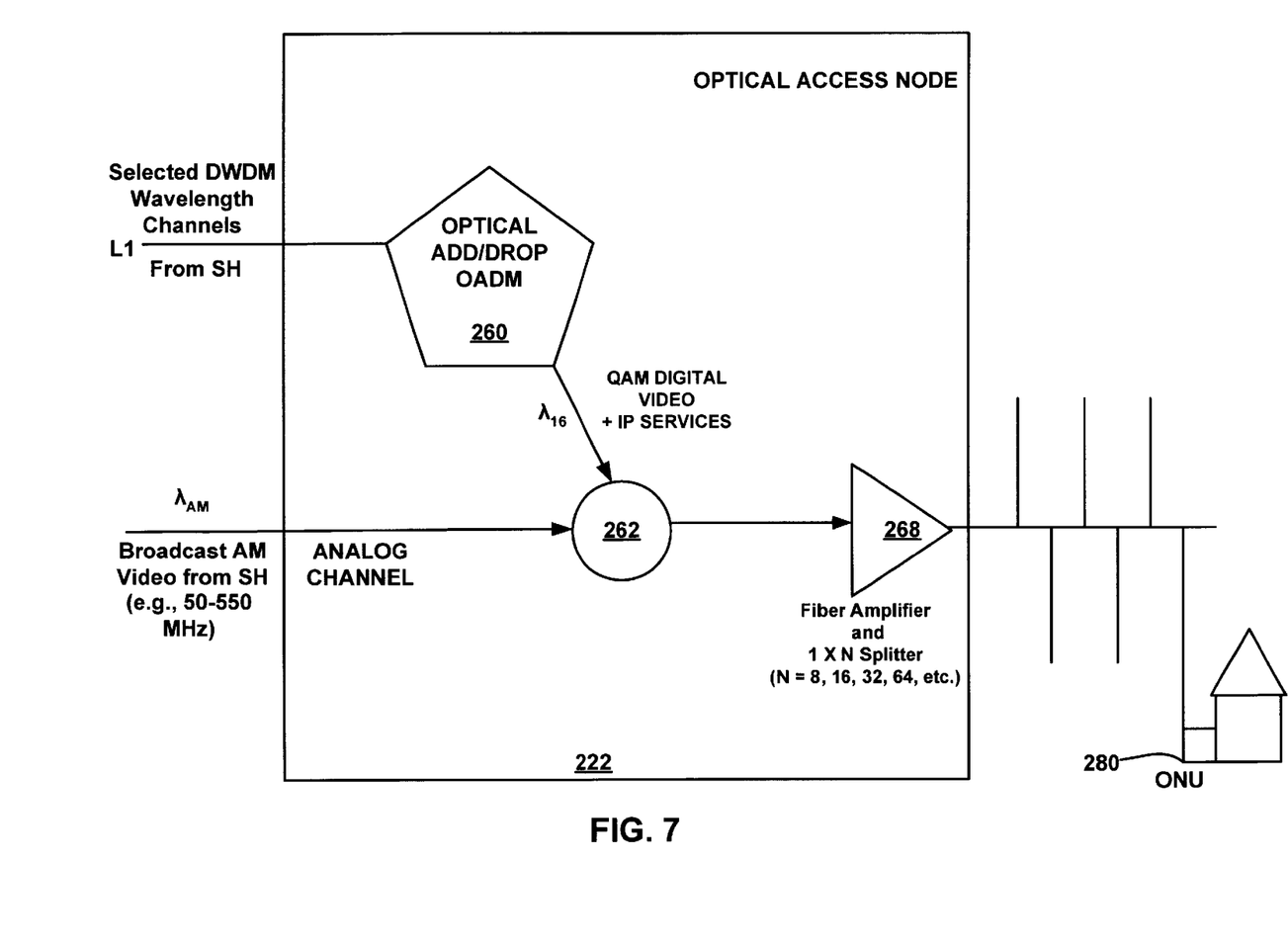
FIG. 7 is a diagram depicting an optical access node configured to deliver digital broadband access to residential and home-based business and telecommuting subscribers in accordance with a pure Fiber-To-The-Home architecture constructed in accordance with the teachings of the present invention.

To this end, the DWDM channels as channels $\lambda_{16}$ and $\lambda_{32}$ are first directed, within the optical access node, to an optical add/drop or C/L band bandpass filter 260 which separates the C-band wavelength $\lambda_{16}$ and L-band wavelength $\lambda32$. Wavelength channel $\lambda_{16}$ is combined in combiner 262 with the AM video channel and then converted and amplified by a conventional optical receiver/converter and RF amplifier unit 264 for transmission over the coaxial plant 266 as previously described. Wavelength channel $\lambda_{32}$, on the other hand, is directed to an amplifier such, for example, as an erbium doped fiber amplifier (EDFA) 268 in order to obtain a signal suitable for splitting and distribution to a plurality of home business subscribers. By way of illustrative example, a passive optical network star (PON) configuration may be obtained using multiple spar splitters as 1XN splitter 270. By cascading a number of such splitters, it is possible to share a single wavelength channel, as wavelength channel $\lambda_{32}$, among a plurality of subscribers via a passively split fiber plant 278 connected to respective ONU's 280. Transmission in the upstream direction is accommodated in an identical manner. Alternatively, an optical bus structure using a plurality of optical power splitters or optical taps may be employed to distribute/aggregate the optical signals being exchanged between the optical access node and each associated optical network unit.

Advantageously, the architecture of the present invention is sufficiently scalable as to ultimately allow all subscribers of what began as an HFC network to be incrementally added until a complete transformation into a FTTH network has been achieved, ultimately supplanting or obviating the coaxial plant entirely. An example of such an end result is depicted in FIG. 7, where it will be seen that once all homes have been equipped with an optical network unit (ONU). Here, it is no longer necessary, though it may still be desirable, employ multiple wavelength bands as all subscribers will be afforded access to the broadband capacity of the architecture. In the illustrative example depicted in FIG. 7, a single wavelength channel, $\lambda_{16}$, is shared by the subset of subscribers served by optical access node 222. Digiral broadband video and business communications traffic are thus simultaneously transported to optical access node 222 at this single exemplary wavelength via a link L1 with the secondary hub, and optical add drop multiplexer 260 directs signals (e.g., signals on wavelength channel $\lambda_{16}$ ) to the ONU 280 associated with each subscriber via all optical fiber plant 278.

It is to be understood that the above described embodiments are merely illustrative of the principles of the invention. Various modifications and changes may be made thereto by those skilled in the art which will embody the principles of the invention and fall within the spirit and scope thereof.

What is claimed is:

1. A method of operating a hybrid fiber coax transmission system to selectively provide at least one of coaxial cable and fiber to the home (FTTH) communication services to homes of individual subscribers, comprising the steps of:
   directing, via a fiber portion of the transmission system, first wavelength division multiplexed (WDM) optical signals corresponding to a first category of subscriber service from a headend to a plurality of fiber nodes for conversion to respective electrical signals, said first WDM optical signals being in a first wavelength band;
   transmitting said respective electrical signals, via a coaxial cable portion of the transmission system, to homes of individual residential subscribers; and
   exchanging, via a fiber portion of the transmission system, second WDM optical signals corresponding to a second category of subscriber service between a headend and at least one of said homes of individual residential subscribers, said second WDM optical signals being in a second wavelength band different from said first wavelength band whereby WDM optical signals within said first and second wavelength bands are multiplexed and demultiplexed by respective optical equipment of the transmission system.

2. The method of claim 1, wherein said first wavelength band is between from about 1530 nm to about 1560 nm.

3. The method of claim 2, wherein said second wavelength band is between from about 1570 nm to about 1610 nm.

4. The method of claim 1, wherein quadrature amplitude modulated (QAM) digital signals are broadcast to subscribers of said first category of subscriber service during said directing step.

5. The method of claim 4, wherein said QAM signals are at least one of video and data signals.

6. The method of claim 1, wherein in a second directing step, amplitude modulated video signals at frequencies of from about 50 to about 550 MHZ are optically directed to said plurality of fiber nodes and transmitted as electrical signals to said plurality of individual subscribers.

7. The method of claim 1, wherein baseband modulated digital data signals are exchanged during said exchanging step.

8. The method of claim 1, wherein said digital data signals are modulated at a rate of at least 622 Mb/s.

9. The method of claim 8, wherein said digital data signals are modulated at a rate of at least 2.4 Gb/s.

10. The method of claim 1, wherein said first category of subscriber service is residential service characterized by asymmetrical transmission primarily in a downstream direction from said headend to said subsets of individual subscribers.

11. The method of claim 10, wherein said second category of subscriber service is high speed data communication service characterized by, with respect to said at least one subscriber, more symmetrical transmission at substantially similar rates in both upstream and downstream directions.

12. A method of operating a hybrid fiber coax transmission system, comprising the steps of:
   directing, via a fiber portion of the transmission system, first wavelength division multiplexed (WDM) optical signals from a headend to a plurality of fiber nodes for demultiplexing and conversion to respective electrical signals, said first WDM optical signals being in a first wavelength band;
   transmitting said respective electrical signals, via a coaxial cable portion of the transmission system, to homes of individual subscribers; and
   exchanging, via a fiber portion of the transmission system, second WDM optical signals between a headend and at least one of said fiber nodes,
   demultiplexing said second WDM signals at said at least one fiber node and transmitting at least one demultiplexed wavelength channel to at least one of said individual subscribers via an optical communication link, said second WDM optical signals being in a second wavelength band different from said first wavelength band.

13. The method of claim 12, wherein said first wavelength band is between from about 1530 nm to about 1560 nm.

14. The method of claim 13, wherein said second wavelength band is between from about 1570 nm to about 1610 nm.

15. The method of claim 12, wherein said at least one demultiplexed wavelength channel is time division multiplexed to facilitate sharing by a plurality of said individual subscribers.

16. The method of claim 12, wherein baseband modulated digital data signals are exchanged during said exchanging step.

17. The method of claim 12, wherein said first category of subscriber service is residential cable television service characterized by asymmetrical transmission in primarily a downstream direction from said headend to said individual subscribers, and wherein said second category of subscriber service is high speed data communication service characterized by, with respect to said at least one residential subscriber, more symmetrical transmission at substantially similar rates in both upstream and downstream directions.

18. A method of upgrading a hybrid fiber coax transmission system having a plurality of optical nodes operative to receive wavelength division multiplexed (WDM) optical signals from a headend and to direct demultiplexed optical signals in a first wavelength band to respective groups of optical access units, each group being associated with a corresponding optical node and each optical access unit being adapted to convert said demultiplexed optical signals to electrical signals for distribution to respective subsets of subscribers via coaxial cable, said method comprising the steps of:

replacing a first of said optical access units with a plurality of multiple wavelength band optical access units, each said multiple wavelength band optical access unit being adapted to receive, via a fiber portion of the transmission system, demultiplexed optical signals in said first wavelength band and in a second wavelength band, to convert optical signals in said first wavelength band to electrical signals for transmission to a subset of residential subscribers previously associated with the first of said optical access units, and to exchange demultiplexed optical signals in said second wavelength band with at least one subscriber of said subset of residential subscribers previously associated with the first of said optical access units to thereby accommodate higher bandwidth business communication services;

configuring a first of said optical nodes to receive WDM optical signals in said first and second wavelength bands and to direct demultiplexed optical signals in said first and second wavelength bands via a fiber portion of the transmission system to at least one of said plurality of multiple wavelength band optical access units;

establishing an optical link between said at least one of said multiple wavelength band optical access units and said at least one subscriber of higher bandwidth business communication services, said optical link being dimensioned and arranged to optically exchange information, transmitted via optical signals of said second wavelength band, between said headend and said at least one subscriber; and     using existing coaxial cable links to exchange signals between said at least one of said multiple wavelength band optical access units and lower bandwidth capacity requesting subscribers of a corresponding subset of subscribers.

19. The method of claim 18, wherein said first wavelength band is between from about 1530 nm to about 1560 nm.

20. The method of claim 19, wherein said second wavelength band is between from about 1570 nm to about 1610 nm.

* * * * *